United States Patent [19]

Poskitt

[11] 4,042,554
[45] Aug. 16, 1977

[54] PROCESS FOR THE PREPARATION OF A STORAGE STABLE MASTIC ADHESIVE

[75] Inventor: Ralph Leroy Poskitt, Wilmington, Del.

[73] Assignee: E. I. Du Pont de Nemours and Company, Wilmington, Del.

[21] Appl. No.: 609,996

[22] Filed: Sept. 3, 1975

[51] Int. Cl.$^2$ .............................................. C08L 11/02
[52] U.S. Cl. ........................ 260/29.7 NR; 260/27 BB; 260/29.7 D; 260/29.7 GP; 260/29.7 H
[58] Field of Search ................. 260/27 BB, 29.7 NR, 260/29.7 D, 29.7 GP, 29.7 H

[56] References Cited

U.S. PATENT DOCUMENTS

| | | | |
|---|---|---|---|
| 3,767,607 | 10/1973 | Schneider | 260/27 BB |
| 3,876,732 | 4/1975 | Kitagawa et al. | 260/29.7 D |
| 3,878,154 | 4/1975 | Keown | 260/29.7 H |

*Primary Examiner*—M. J. Welsh

[57] ABSTRACT

Storage stable mastic adhesive is produced by blending a neoprene latex having a gel content of at least 60% and a neoprene latex in which the polymer is at least almost completely soluble in toluene and mixing the blend with an organic water-immiscible solvent for neoprene until a water-in-oil type dispersion is obtained. The viscosity and/or storage stability of the mastic can be further increased by the addition of water to the mastic.

10 Claims, No Drawings

PROCESS FOR THE PREPARATION OF A STORAGE STABLE MASTIC ADHESIVE

This invention relates to a mastic adhesive suitable for use in the installation of wall tile, floor tile and the like, having an extended storage stability over that previously known.

It is known to produce mastic adhesives from neoprene latex by combining a water immiscible solvent for the neoprene with the latex in the presence of a cationic or amphoteric surfactant. Such a process is disclosed and claimed in U.S. Pat. No. 3,878,154, issued Apr. 15, 1975, to R. W. Keown. The mastic adhesives prepared by the Keown process, although satisfactory when used shortly after production, are not sufficiently stable that they can be stored for longer periods of time; for example, such adhesives become unsatisfactory when stored for 3 weeks at 50° C.

The present invention provides a process for preparing a mastic adhesive that is sufficiently storage stable at 50° C. for 6 weeks or more that is still useful.

The neoprene latex i.e., polychloroprene latex used in the process of the present invention is a blend of a high solids content gel latex, and a high solids content sol latex. The term "gel" means that at least 60 wt. % of the neoprene polymer in the latex is insoluble in toluene. The term "sol" latex means that the neoprene polymer is at least almost completely soluble in toluene. Preferably, the sol latex is completely soluble in toluene, but a "sol" latex may contain up to about 15% by weight insoluble neoprene polymer and still be satisfactory. The polymer of the sol latex should have a Mooney viscosity (ML — 2½, 100° C.) of 30 to 45. The weight ratio of polymer from the gel latex to polymer from the sol latex should be in the range of 60/40 to 40/60. The blend of latexes should have a solids content (i.e., a neoprene content) of between 50 and 65% by weight. Normally both the sol latex and the gel latex will have a solids content of between 50 and 65%, but it is possible to produce a satisfactory product using starting material outside this range provided that the solid content of the blend is between 50 and 65% by weight.

The blend of latexes is then mixed with an organic water-immiscible neoprene solvent containing an inert filler and dissolved adhesion promoting resin. The water-immiscible neoprene solvent can be any solvent or mixture of solvents in which an uncrosslinked neoprene is soluble to the extent of 10 parts or more by weight per 100 parts of solvent, and which is not soluble in water to the extent of 5 parts or more by weight per 100 parts of water. Preferred solvents are those having a solubility parameter between 8–9.5 and a hydrogen bonding index between 2–5.5, both values being determined as described in the trade bulletin "Du Pont Elastomers in Adhesives" in the article by J. F. Hagman entitled "Solvent Systems for Neoprene — Predicting Solvent Strength", March 1964. Representative useful solvents are benzene, toluene, xylene, turpentine, and mixtures of toluene and cyclohexane, preferably in the ratio of 60 to 40 by volume. Preferably the amount of water-immiscible solvent is chosen so that the total solids content of the mastic composition is between 15 and 80% by weight, and at least equal on a weight basis to the amount of neoprene present.

The adhesion promoting resin can be selected from any of the hundreds known in the art. Representative examples are terpenes, terpene-phenolic resins, cumarone indene resins, phenolic-modified cumarone-indene resins, rosin-modified phenolic resins, modified rosin, rosin esters, and pentaerythritol esters. Preferred resins are those which contain free carboxyl or phenolic hydroxyl functional groups, such as rosin-modified phenolic resins, modified rosins, and terpend-phenolic resins, and their reaction products with magnesium oxide. The quantity of resin used is not critical but generally falls between 10–200 parts per 100 parts of neoprene, all quantities being on a weight basis, with 20–60 parts preferred.

Fillers are needed in the present invention, and any filler having conventional utility in the mastic and adhesives art can be employed. Included among the suitable fillers are clay, calcium carbonate, diatomaceous earth, silica flour, and carbon black. The amount of filler generally is between 50–300 parts per 100 parts by weight of neoprene. The amount of filler usually is varied with the solvent, being increased as the quantity of solvent is increased. Carbon black is normally used only for coloring at low concentrations varying from 3–10 parts, but it may be used in greater quantity, if desired.

Other coumpounding ingredients, such as magnesium and zinc oxides, antioxidants and curing agents are included in the mastic formulation to improve the physical properties and the durability of the adhesive bond resulting from the use of the mastic. These materials are those conventionally used in neoprene latex technology.

The sol and gel latexes can be made by techniques well known in the art. The major difference in the method of preparing a gel latex from a sol latex is that a larger amount of chain transfer agent is employed to produce a sol latex. Suitable chain transfer agents are diethyl xanthogen disulfide and tridecyl mercaptan. The sol and gel latexes may be prepared by directly polymerizing the latex to a high solids content by the methods known in the art, or the latexes may be made at a lower solids content and then creamed to produce high solids content latexes.

The process of producing the mastic adhesive may be summarized as follows:

A process for the preparation of a mastic adhesive having improved storage stability which comprises (A) blending a high solids content neoprene latex having toluene-insoluble gel content of at least 60% and a neoprene latex in which the polymer is at least almost completely soluble in toluene, the neoprene of the latex which is at least almost completely soluble in toluene having a Mooney viscosity (ML — 2½, 100° C.) of 30 to 45, the ratio of neoprene from latex which is at least almost completely soluble in toluene to the ratio of neoprene from latex that has a toluene insoluble gel content of at least 60% being from 60/40 to 40/60, to form blend having a solids content of between about 50 and 65% by weight, (B) mixing said blend with an organic water-immiscible neoprene solvent containing inert filler and dissolved adhesion promoting resin until the mixture has increased in viscosity to the mastic range and a water-in-oil type dispersion is obtained.

The process can be carried out in the presence of amphoteric or cationic surfactants of the type and in the amounts disclosed in the Keown patent, but surfactants are not necessary to obtain a satisfactory product. A mixture of polyoxyethylated fatty amine and polyoxyethylated sorbitol oleate is the preferred surfactant.

After the blend of latexes and the water-immiscible solvent have been mixed to form a mastic, the viscosity and/or the storage stability of the mastic can be further increased by the addition of water followed by further mixing. The amount of water added at this time may vary from none at all up to about 40 parts per 100 parts of the oil-in-water type dispersion. Preferably between 5 and 30 parts of water are added.

In the following examples al parts and percentages are by weight unless otherwise specified, and all temperatures are in degrees centigrade.

EXAMPLES

PREPARATION OF LATEXES

Two chloroprene-in-water emulsions are made using the following recipes:

| | Parts | |
|---|---|---|
| Chloroprene Solution | A | B |
| Chloroprene | 100 | 100 |
| Dimerized lineolic acid[a] | 1.72 | 1.72 |
| Disproportionated wood rosin[b] | 0.15 | 0.15 |
| 4-tert-Butyl catechol (90%) | 0.008 | 0.008 |
| Diethyl xanthogen disulfide | 0.10 | — |
| Primary tridecyl mercaptan | — | 0.38 |
| Water Solution | | |
| Water | 57 | 57 |
| Potassium salt of condensate of formaldehyde and alkyl naphthalene sulfonic acid[c] | 0.91 | 0.91 |
| Potassium hydroxide | 1.10 | 1.10 |
| Dextrose | 0.10 | 0.10 |
| Potassium sulfite | 0.10 | 0.10 |

[a]Essentially a $C_{36}$ dibasic acid resulting from the polymerization of linoleic acid. The dimer content is about 75%, the trimer content is about 22%, and the monomer content is about 3%. It is commercially available as "Empol 1022" from Emery Industries, Inc.
[b]Disproportionated wood rosin, obtainable from Hercules, Inc. as Resin 3003, which has been partially neutralized with potassium carbonate and has an acid number of 157. 1.9 parts of this rosin is equivalent to 1.76 parts of free acid rosin.
[c]The material used is "Daxad 11 KLS" supplied by W.R. Graceand Co. It is the potassium salt of the condensate of formaldehyde and alkylnaphthalenesulfonic acid; it is stable in the presence of mild acids and alkalies; it has practically no tendency to foam and it has a pH (1% sol. at 72° F.) of 7 to 8.5. Parts are based on the active ingredient.

Polymerization is carried out at 45° C. in a nitrogen atmosphere by the addition, as required, of an aqueous solution containing 2.5° % potassium persulfate and 0.06% of sodium 2-anthraquinone sulfonate. During the latter stages of the polymerization a double strength catalyst solution is used. When the polymerization has progressed to 89% conversion, the polymerization is stopped by adding 0.02 part of 4-tert-butyl catechol and 0.02 part of phenothiazine in a toluene emulsion containing 1% of each. Finally 2.5 parts of an aqueous solution containing 35% of the potassium salt of disproportionated wood rosin ("Dresinate") 91, Hercules, Inc.) and the unreacted chloroprene is stripped from the latex with steam.

Latex A after stripping has a nonvolatile solids content of 59% and contains a polymer that is 79% insoluble in toluene.

Latex B after stripping has a nonvolatile solids content of 59% and contains a polymer that has a Mooney viscosity (ML — 2½, 100° C.) of 39 and is essentially completely soluble in toluene.

A hydrocarbon resin having a melting point of 100° C. (50 g., "Picco" 6100, Hercules, Inc.), a modified terpene phenolic resin having a melting point of 150° C. (10 g. "Durez" 12603, Hooker Chemical Corp.) a tert-butylphenolic-formaldehyde resin (30 g., CKM 1634, Union Carbide Corp.), 2,2'-methylene-bis[4-methyl-6-t-butyl-phenol](2 g.), and a mixture of polyoxyethylated fatty amine and polyoxyethylated sorbitol oleate (3 g., Atlas G 2090, ICI United States, Inc., in 9 g. water) are dissolved in a mixture of 70 g. of toluene, 140 g. of hexane, and 140 g. of acetone. To the solution of resins obtained 4 g. magnesium oxide, 5 g. zinc oxide, and 140 g. of bentonite are added and the mixture is stirred until the bentonite is wet throughout with solution.

A blend of 83 g. of latex A and 83 g. of latex B, which has been thoroughly mixed to assure homogeneity, is added with gentle stirring to the previously prepared mixture of resin solution, magnesium oxide, zinc oxide, and bentonite contained in a one-quart paint can. Immediately the paint can is sealed and shaken on a paint shaker for 5-10 minutes, and finally 50 g. of water is added with stirring. The viscous mastic composition thus obtained is ready for use as an adhesive or sealant and exhibits exceptionally good application rheology and adhesive properties.

Application rheology is a qualitative judgement based on the ease of manually applying the mastic to a vertical surface with a trowel and on the resistance of the applied mastic to flow on the vertical surface under the force of gravity, a phenomenon called "slump". The mastic made in this example shows excellent resistance to slump, yet the ease of trowelling it was such that it was judged a skilled worker could complete a full day's work without unusual fatigue.

The mastic prepared as described above is placed within a sealed paint can in a 50° C. oven, and its stability to storage at this temperature after intervals of 2, 3, 4 and 6 weeks is judged by inspecting for phase separation and evaluating the application rheology. The mastic prepared by the above described procedure has excellent stability to 6 weeks storage at 50° C., showing no phase separation and little or no change in application rheology.

When the examples are repeated using latex A:latex B ratios of 91 g.:75 g. and 75 g.:91 g., respectively, mastics having both good initial application rheology and good storage stability are similarly obtained.

When latex A:latex B ratios of greater than 100 g.:66 g. or less than 66 g.:100 g. are used, however, stability of the resulting mastics to 6 weeks storage at 50° C. is lacking, although initial properties are excellent. When the ratio is greater than the former value substantial phase separation is observed after 4 weeks at 50° C., and when less than the latter the application rheology after 4 weeks at 50° C. suffers from an increase in viscosity.

I claim:

1. A process for the preparation of a mastic adhesive having improved storage stability which comprises (A) blending a high solids content polychloroprene latex having toluene-insoluble gel content of at least 60% and a polychloroprene latex in which the polymer is at least almost completely soluble in toluene, the polychloroprene of the latex which is at least almost completely soluble in toluene having a Mooney viscosity (ML — 2½, 100° C.) of 30 to 45, the ratio of polychloroprene from latex which is at least almost completely soluble in toluene to the ratio of polychloroprene from latex that has a toluene insoluble gel content of at least 60% being from 60/40 to 40/60, to form blend having a solids content of between about 50 and 65% by weight, (B) mixing said blend with an organic water-immiscible polychloroprene solvent containing an inert filler and dissolved adhesion promoting resin until the mixture has increased in viscosity to the mastic range and a water-in-oil dispersion is obtained.

2. The process of claim 1 in which the amount of organic water-immiscible polychloroprene solvent mixed with the blend is at least equal on a weight basis to the amount of neoprene in the blend.

3. The process of claim 2 in which the amount of organic water-immiscible solvent is chosen so that the total solids content of the mastic composition is between 15 and 80 parts by weight.

4. The process of claim 1 which includes the additional step of adding water to the water-in-oil dispersion to increase the viscosity of the mastic and/or increase the storage stability of the mastic adhesive.

5. The process of claim 4 in which the amount of water added to the water-in-oil dispersion is about 5 to 30 parts per 100 parts of said dispersion.

6. The process of claim 1 in which a cationic or amphoteric surfactant is present at the time the blend and the organic water-immiscible solvent are mixed.

7. The process of claim 6 in which the organic water-immiscible solvent contains between 10 and 200 parts by weight of adhesion promoting resin per 100 parts of polychloroprene contained in the latex.

8. The process of claim 7 in which the organic water-immiscible solvent contains between about 50 and 300 parts of inert filler per 100 parts of polychloroprene contained in the latex.

9. The process of claim 8 in which the filler is bentonite.

10. The process of claim 6 in which the surfactant is a mixture of polyoxyethylated fatty amine and polyoxyethylated sorbitol oleate.

* * * * *